United States Patent Office 3,395,945
Patented Aug. 6, 1968

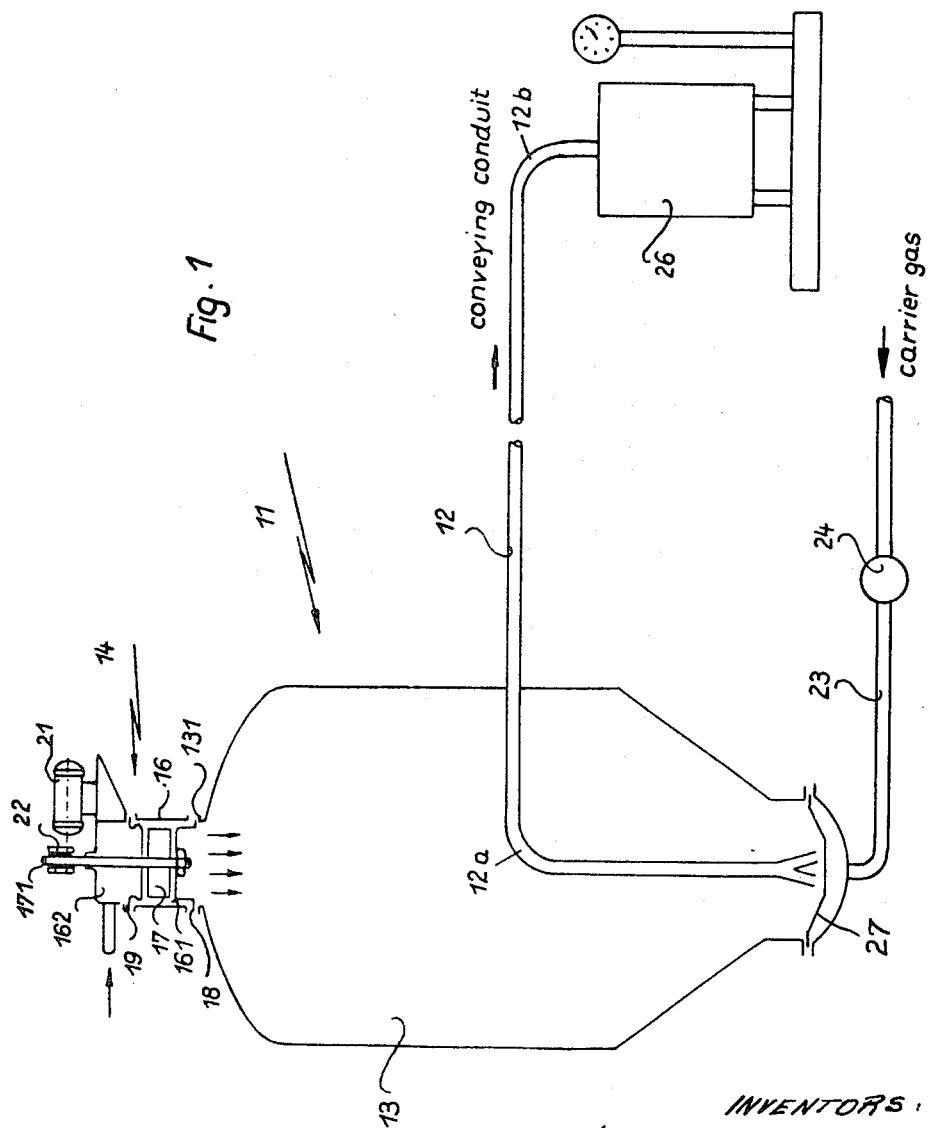

3,395,945
METHOD OF CONVEYING FINE GRANULAR AND PULVEROUS MATERIAL BY GASEOUS MEANS
Hermann-Josef Kopineck, Dortmund-Kirchhorde, Herbert Muszkiewicz, Dortmund, and Claus Schlotter, Dortmund-Scharnhorst, Germany, assignors to Polysius G.m.b.H., Neubeckum, Germany
Original application June 21, 1965, Ser. No. 465,559, now Patent No. 3,314,731, dated Apr. 18, 1967. Divided and this application Dec. 27, 1966, Ser. No. 604,666
Claims priority, application Germany, June 20, 1964, H 53,034
4 Claims. (Cl. 302—66)

ABSTRACT OF THE DISCLOSURE

Method of conveying pulverous solid material with a gaseous vehicle in which the gas is passed upwardly through the pulverous material thereby entraining the pulverous material therein while simultaneously repetitive shock waves are supplied to the gas and pulverous material to increase the concentration of the pulverous material in the gas.

---

The present invention relates to a method of conveying fine granular and also pulverous material, according to which such material is by means of a carrier gas fluidized in a closed container and by means of a variable conveying pressure caused by the carrier gas introduced in variable quantities into said container discharged from the container and conveyed to and through a feeding line. This application is a divisional application of our co-pending application Ser. No. 465,559, now Patent No. 3,314,731, filed June 21, 1965.

Of particular interest in this connection is the obtainable conveying or delivery output which is manifested by the specific quantity of the carrier gas required for conveying the fine granular or pulverous material and also by the quantity of conveyed material per time unit.

It is an object of the present invention to carry out the delivery of maximum quantities of material of the above mentioned type per time unit by means of as little quantities of carrier gas as possible.

It is also an object of the present invention to maintain the values characteristic for the delivery substantially constant during the delivery operation.

Figure 1A:
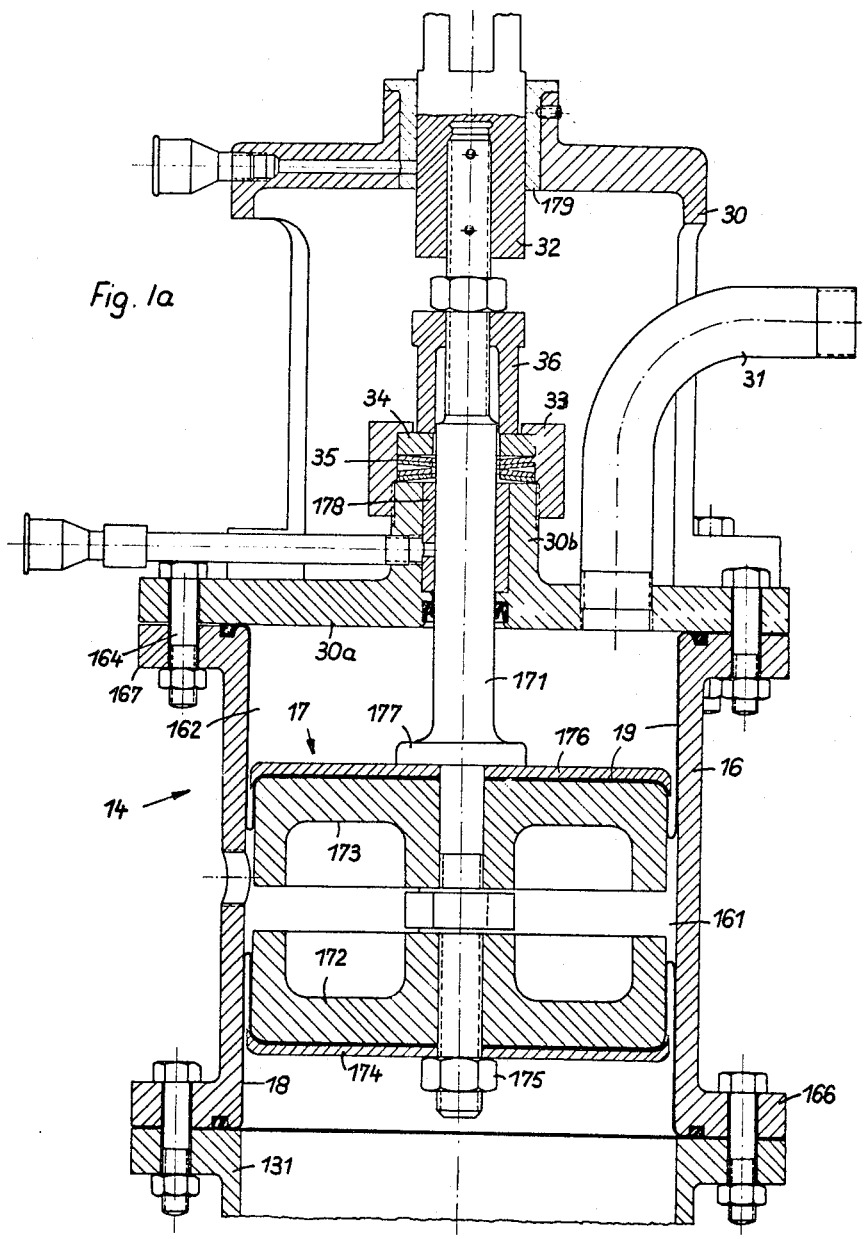
Figure 2:
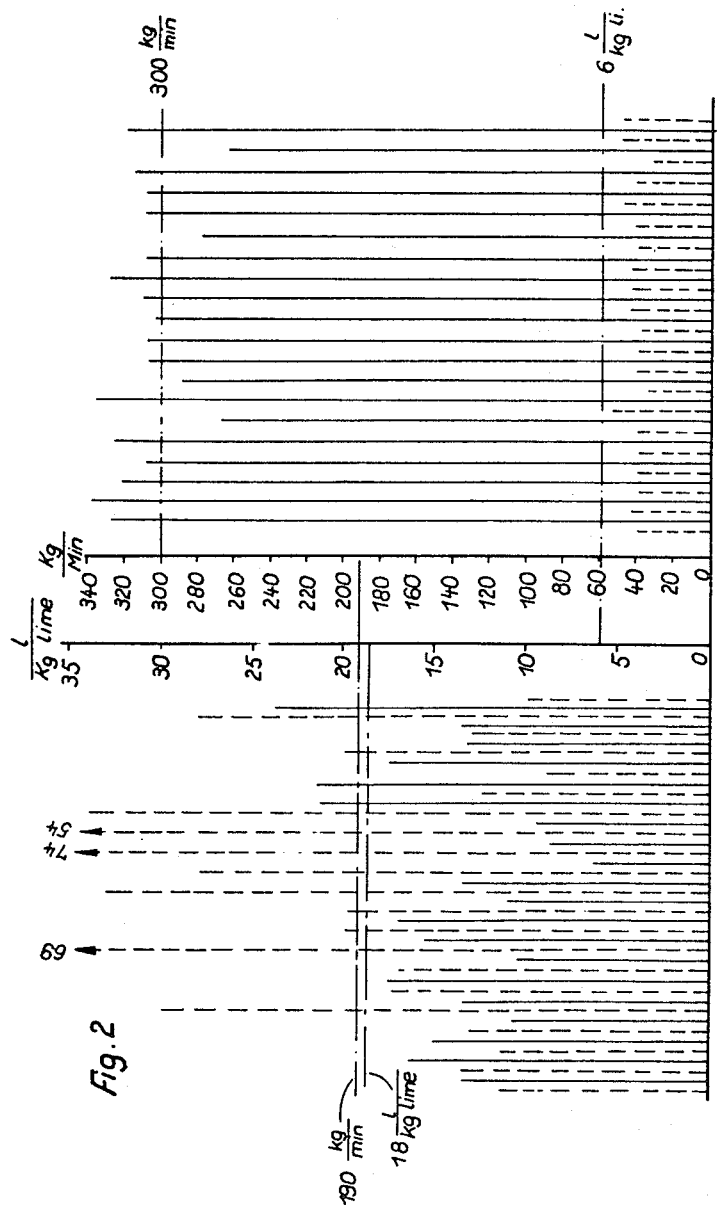

These and other objects and advantages of the invention will appear more clearly from the following specification in connection with the accompanying drawings, in which:

FIG. 1 diagrammatically illustrates a testing installation employed for carrying out the method according to the invention;

FIG. 1a illustrates in greater detail the pressure shock emitter employed in the installation shown in FIG. 1;

FIG. 2 graphically illustrates the test results carried out by the installation of FIG. 1.

Aside from the dimensions of the delivery installation, such as size of the container, cross section of the conduits, and length of the delivery path on one hand and the property of the material to be delivered or conveyed, such as particle size, bulk weight, and moisture content on the other hand, the delivery output depends on the delivery pressure and within certain limits also on the respective container content. Tests have proved that for every delivery installation, every material, and every degree of filling of the container there exists a defined delivery pressure for obtaining an optimum delivery output. When said defined delivery pressure drops, the quantity of material delivered or conveyed per time unit also drops, whereas when said defined delivery pressure increases, the specific conveying quantity of gas increases while at the same time the quantity of material delivered per time unit decreases. Therefore, an increase in the delivery output by increasing the delivery pressure about the said defined delivery pressure is not possible.

According to the present invention, additional periodic pressure variations are produced in the container and preferably in the fluidizing chamber, independently of the change in the delivery pressure but in conformity with the changing degree of filling of the container. This step has surprisingly resulted in an improvement of the delivery output and, more specifically, by increasing the quantity of material conveyed per time unit and also by lowering the specific quantity of carrier gas. This method furthermore brings about the advantage of a more uniform and more quiet delivery. Moreover, variations in the consistency of the delivered material no longer affect the delivery to a great extent, and the material to be delivered is entirely discharged.

Corresponding periodically repeated pressure variations may be initiated, for instance, by means of the movement of a piston acting upon the interior of the container or by means of pressure shocks produced by a diaphragm held by the container walls. The actuation of the diaphragm may be effected electrically or mechanically or especially pneumatically. It is also possible to produce the pressure shocks by a combined piston-diaphragm arrangement.

A number of tests have been carried out for proving the improvement in the delivery obtained by the present invention, which tests will now be described in detail. With reference to FIG. 1, this figure shows a material conveying device 11 of a standard design with a 1½-inch delivery conduit 12, said device 11 having a capacity of 1,000 liters. Arranged on said device 11 is a mechanical pressure shock or impulse emitter 14 having an output of 3 kilowatts with a sequence of 10 pressure shocks per second. This pressure shock emitter 14 which acts upon the fluidizing chamber 13 is flanged to a pipe section 131 in the container lid.

Pressure shock emitter 14 (FIGS. 1, 1a) comprises a cylinder 16 with a piston displacement chamber 161 and a pressure chamber 162 closed at the top by a cover 30a forming a part of a housing 30 and connected to cylinder 16 by means of screws 164. Cover 30a has screwed thereinto a conduit 31 adapted to be connected to a source of compressed gas of a pressure of 3.5 atmospheres above atmospheric pressure. Pressure shock emitter 14 furthermore comprises a piston 17 reciprocable in chamber 161 and made up of two piston sections 172 and 173, and a piston rod 171. Piston 17 is biased in the downward direction by the pressure from conduit 31 which acts on the upper face of the piston.

Piston sections 172 and 173 have connected thereto cup sleeves or diaphragms 18 and 19, respectively. More specifically, diaphragm 18 is on one hand connected to piston section 172 by means of a plate 174 and a nut 175, and on the other hand, clamped between a flange 166 of cylinder 16 and flange 131 of container 13. Similarly, diaphragm 19 is on one hand connected to piston section 173 by means of a plate 176 clamped between a flange 177 of piston rod 171 and piston section 173, and is on the other hand clamped between cover 30a and a flange 167 of cylinder 16. Thus, piston 17 is by means of diaphragms 18 and 19 shielded and sealed with regard to the interior of container 13 and pressure chamber 162.

Piston rod 171 is slidably mounted in bearings 178, 179 in housing 30. The upper end of piston rod 171 has connected thereto a member 32 adapted to be actuated by a cam 22 driven by driving means 21 (shown in FIG. 1). Cam disc 22 is so designed that the movement of piston 17 in the direction toward container 13 is effected in a shock-like manner, whereas the movement in opposite direction is effected relatively slowly. The said movement of piston 17 toward container 13 is effected by the pressure on top of the piston delivered thereto by conduit 31.

A housing portion 30b of housing 30 has screwed thereinto a cup 33 encasing a disc 34 and dish spring means 35 clamped between disc 34 and housing portion 30b. Disc 34 is engaged by a member 36 screwed onto piston rod 171, the arrangement being such that said dish spring means 35 continuously urges said piston rod 171 in upward direction into engagement with cam 22.

For the above-mentioned tests, the conveying device 11 was filled with fine lime of customary consistency and was subjected to the influence of a carrier gas introduced at a pressure of about 2.1 atmospheres above atmospheric pressure through a conduit 23 provided with a gauge 24 adapted to measure the gas quantities and through a sintered plate 27. The material passed through the 25-meter-long conduit 12 which extends from a point adjacent sintered plate 27 through two 90°-elbow sections 12a and 12b, to a collecting container 26, and was weighed. The major portion of conduit 12 extends horizontally while forming a loop made up of four 45°-elbow sections (not shown). A number of parallel tests were carried out with a turned-off and a turned-on pressure shock emitter 14. The results obtained during these tests are graphically recorded in FIG. 2. More specifically, on the left side of the ordinate there are plotted the results of the tests with turned-off pressure shock emitter, whereas on the right side of said ordinate there are plotted the test results with turned-on pressure shock emitter 14. The quantity of the material delivered per time unit is indicated by solid lines, whereas the specific quantity of carrier gas is indicated by dash line.

With the above-mentioned test conditions, with the heretofore customary delivery method, the medium quantity of delivered material was ascertained as amounting to 190 kilograms per minute, and the medium specific gas quantity was ascertained as amounting to 18 liters per kilogram of material. On the other hand, with the pressure shock emitter 14 turned on, the medium quantity of delivered material was ascertained as amounting to 300 kilograms per minute while a medium specific gas quantity in the amount of 6 liters per kilogram of material was ascertained. This means that with the method according to the present invention a 50% improvement was obtained with regard to the quantity of material delivered per time unit, while at the same time the specific quantity of carrier gas was reduced by 66%.

The sequence of pressure shocks and energy to be selected in each instance in conformity with the respective dimensions of the apparatus and the properties of the material to be conveyed can easily be ascertained so as to obtain the most favorable effect. The sequence of the pressure oscillations is, for instance, with the employed mechanical pressure shock emitter, determined by the variable speed of rotation of cam disc 22. The energy is determined by the variable piston stroke in combination with the variable pressure acting or resting on piston 17.

It is, of course, to be understood, that the present invention is, by no means, limited to the particular method described above, but also comprises any modifications within the scope of the appended claims.

What we claim is:

1. In a method of fluidizing and conveying fine granular and pulverous solid materials; supporting said materials in a closed container, constantly supplying gas under a uniform pressure to the bottom of the container beneath said material and constantly causing said gas under uniform pressure to flow upwardly into the material so that the gas will fluidize the material and the material will become entrained in the gas, withdrawing said fluidized material from said container solely from a point above the lowest level of the said material therein, and additionally and repetitively supplying from a separate and distinct power source shock-like pressure variations to the interior of said container to thereby increase the concentration of the material in the gas withdrawn from the container.

2. A method according to claim 1, in which said additional repetitive shock-like pressure variations are developed in said container.

3. A method according to claim 1, in which said repetitive shock-like pressure variations are created mechanically in the form of periodically repeated pressure shocks.

4. The method according to claim 1 which includes connecting a chamber to the interior of the container at a point above the said material, and in which each of said pressure shocks is created by slowly drawing gas from the container into the chamber, and then suddenly expelling the gas from the chamber into the container.

References Cited
UNITED STATES PATENTS

| | | | |
|---|---|---|---|
| 1,308,464 | 7/1919 | Westly | 302—26 |
| 1,492,352 | 4/1924 | Campbell | 302—26 |
| 2,120,003 | 6/1938 | Schanz | 302—26 |
| 2,867,478 | 1/1959 | Shale | 302—26 |
| 3,169,664 | 2/1965 | Meinicke | 222—193 X |

EVON C. BLUNK, *Primary Examiner.*

M. L. AJEMAN, *Assistant Examiner.*